(12) United States Patent
Baust et al.

(10) Patent No.: US 11,584,454 B2
(45) Date of Patent: Feb. 21, 2023

(54) CONTROL DEVICE, AN AT LEAST SEMI-AUTOMATICALLY DRIVING VEHICLE, A VEHICLE COMBINATION, AND A METHOD

(71) Applicant: Robert Bosch GmbH, Stuttgart (DE)

(72) Inventors: Benjamin Baust, Freiberg/Neckar (DE); Markus Schulz-Weiling, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 437 days.

(21) Appl. No.: 16/735,786

(22) Filed: Jan. 7, 2020

(65) Prior Publication Data

US 2020/0216122 A1 Jul. 9, 2020

(30) Foreign Application Priority Data

Jan. 8, 2019 (DE) .......................... 102019200149.1

(51) Int. Cl.
| | | |
|---|---|---|
| *B62D 47/00* | (2006.01) | |
| *B60D 1/48* | (2006.01) | |
| *B60W 40/08* | (2012.01) | |
| *G05D 1/02* | (2020.01) | |
| *B60D 1/64* | (2006.01) | |
| *G05D 1/00* | (2006.01) | |

(52) U.S. Cl.
CPC ........... *B62D 47/006* (2013.01); *B60D 1/481* (2013.01); *B60D 1/64* (2013.01); *B60W 40/08* (2013.01); *G05D 1/021* (2013.01); *G05D 1/0088* (2013.01)

(58) Field of Classification Search
CPC ........ B62D 47/006; B60D 1/481; B60D 1/64; B60W 40/08; G05D 1/021; G05D 1/0088
See application file for complete search history.

(56) References Cited

U.S. PATENT DOCUMENTS

| | | | | |
|---|---|---|---|---|
| 4,252,065 A | * | 2/1981 | Bickel | B61D 17/20 |
| | | | | 105/10 |
| 4,421,339 A | * | 12/1983 | Hagin | B62D 47/025 |
| | | | | 280/424 |
| 4,762,191 A | * | 8/1988 | Hagin | B62D 59/04 |
| | | | | 903/909 |
| 6,419,037 B1 | * | 7/2002 | Kramer | B62D 53/005 |
| | | | | 180/14.2 |
| 6,772,698 B2 | * | 8/2004 | Ueta | B61F 3/125 |
| | | | | 105/1.4 |

(Continued)

FOREIGN PATENT DOCUMENTS

| | | | | |
|---|---|---|---|---|
| DE | 4411241 A1 | 10/1995 | | |
| WO | 2009145552 A2 | 12/2009 | | |
| WO | WO-2016099344 A1 | * | 6/2016 | ............... B60K 1/00 |

*Primary Examiner* — Luis A Martinez Borrero
(74) *Attorney, Agent, or Firm* — Norton Rose Fulbright US LLP; Gerard Messina

(57) ABSTRACT

A control device, a vehicle, a vehicle combination, and a method, the control device being designed to provide a first control signal for the approach of the vehicle to a further vehicle in a first portion of a travel route of the vehicle, the control device being designed to provide a second control signal for the coupling of the vehicle to the further vehicle in the first portion of the travel route, in order to provide a passage between the vehicle and the further vehicle, via which a person may change over between the vehicle and the further vehicle.

13 Claims, 5 Drawing Sheets

(56) References Cited

U.S. PATENT DOCUMENTS

| | | | | |
|---|---|---|---|---|
| 6,973,981 | B2* | 12/2005 | Stummer | B62D 59/04 |
| | | | | 180/24.06 |
| 7,658,396 | B2* | 2/2010 | Koch | B62D 47/025 |
| | | | | 280/403 |
| 8,336,901 | B2* | 12/2012 | Andre | B62D 47/025 |
| | | | | 105/8.1 |
| 8,382,143 | B2* | 2/2013 | Andre | B62D 53/005 |
| | | | | 280/403 |
| 8,991,528 | B2* | 3/2015 | Hellholm | B60L 50/61 |
| | | | | 180/14.2 |
| 9,914,495 | B2* | 3/2018 | Han | B62D 47/006 |
| 11,199,853 | B1* | 12/2021 | Afrouzi | G05D 1/0246 |
| 2005/0104321 | A1* | 5/2005 | Koch | B62D 53/005 |
| | | | | 280/403 |
| 2006/0170188 | A1* | 8/2006 | Negre | B62D 33/023 |
| | | | | 280/403 |
| 2010/0044998 | A1* | 2/2010 | Franchineau | B62D 47/025 |
| | | | | 280/491.1 |
| 2011/0108334 | A1* | 5/2011 | Andre | B62D 53/005 |
| | | | | 180/14.2 |
| 2017/0126810 | A1* | 5/2017 | Kentley | G06F 3/0482 |
| 2018/0022405 | A1* | 1/2018 | Gecchelin | B60D 1/62 |
| | | | | 701/23 |
| 2018/0265078 | A1* | 9/2018 | Cervantes | B60K 7/0007 |
| 2020/0171899 | A1* | 6/2020 | Scheer | B60D 1/62 |

* cited by examiner

CONTROL DEVICE, AN AT LEAST SEMI-AUTOMATICALLY DRIVING VEHICLE, A VEHICLE COMBINATION, AND A METHOD

CROSS REFERENCE

The present application claims the benefit under 35 U.S.C. § 119 of German Patent Application No. DE 102019200149.1 filed on Jan. 8, 2019, which is expressly incorporated herein by reference in its entirety.

FIELD

The present invention relates to a control device, a semi-automatically driving vehicle, a vehicle combination, a method, a computer program, and a machine-readable storage medium according.

BACKGROUND INFORMATION

A method for controlling vehicles of a vehicle fleet is described in PCT Application No. WO 2009/145552 82.

SUMMARY

It is an object of the present invention to provide an improved control device, an improved at least semi-automatically driving vehicle, and an improved vehicle combination and an improved method.

This object is achieved with the aid of a control device, a vehicle, a vehicle combination, a method, a computer program, and a machine-readable storage medium, in accordance with the present invention.

In accordance with example embodiments of the present invention, an improved control device for an at least (semi-) automatically driving vehicle may be provided in that the control device is designed to provide a first control signal for the approach of the vehicle to a further vehicle in a first portion of a travel route of the vehicle, the control device being designed to provide a second control signal to couple the vehicle to the further vehicle in the first portion of the travel route in order to enable a passage between the vehicle and the further vehicle, via which a person may change over between the vehicle and the further vehicle.

This design has the advantage that as the vehicle travels along the predefined travel route in the first portion, a passage option is provided for changing over between the vehicle and the further vehicle. A route time for the travel route for the particular vehicle may thus be kept particularly short.

In another specific embodiment, the control device is designed to receive and/or transmit a signal, for example, from the further vehicle and/or to the further vehicle for coupling the vehicle to the further vehicle in the first portion. The coupling procedure between the vehicles may thus be synchronized.

In another specific embodiment, the control device is designed to receive a further signal about a vehicle position of the vehicle, the control device being designed to ascertain the first control signal and the second control signal on the basis of the vehicle position. The coupling procedure may thus be executed fully automatically in the first portion.

In another specific embodiment, the control device is designed, after controlling the coupling of the vehicle to the further vehicle, to provide a third control signal for controlling a connecting door of the vehicle to open the passage.

In another specific embodiment, the control device is designed to receive a coupling signal which signals a mechanical coupling of the vehicle to the further vehicle, the control device being designed to provide the third control signal only after receiving the coupling signal. An incorrect activation of the connecting door is thus avoided.

An at least semi-automatically driving vehicle includes the above-described control device and at least one vehicle drive unit connected to the control device for moving the vehicle in the longitudinal and/or lateral direction, the control device being designed to transmit the first control signal of the vehicle drive unit for the approach of the vehicle and the second control signal for the coupling of the vehicle to the further vehicle to the vehicle drive unit.

In another specific embodiment, the vehicle includes a connecting door situated on a vehicle front and/or on a vehicle rear of the vehicle, the connecting door delimiting a passage to the further vehicle, the control device being designed to transmit the third control signal to the connecting door to move the connecting door from a closed position into an open position.

In another specific embodiment, the vehicle includes a coupling unit for mechanically coupling the vehicle to the further vehicle and a coupling sensor, the coupling sensor being connected to the control device and being designed to provide the coupling signal corresponding to the coupling state of the coupling unit to the control unit.

A vehicle combination includes a vehicle and at least one further vehicle, the vehicle and the further vehicle each being designed as described above, the control device of the vehicle being designed to steer the vehicle along the first travel route at least semi-automatically, preferably driverless, the control device of the further vehicle being designed to steer the further vehicle along a second travel route at least semi-automatically, preferably driverless, the first predefined travel route and the second predefined travel route extending identically in a first portion, the vehicle and the further vehicle being coupled to one another in the first portion. People may thus change over between passenger compartments of the vehicles.

In another specific embodiment, the vehicle delimits a passenger compartment and the further vehicle delimits a further passenger compartment, the passage connecting the passenger compartment to the further passenger compartment for the changeover of the person between the two passenger compartments.

In a method for operating the above-described control device, the control device provides a first control signal for the approach of a vehicle to a further vehicle in a first portion of a travel route, the control device providing a second control signal for the coupling of the vehicle to the further vehicle in the first portion of the travel route to enable a passage between the vehicle and the further vehicle, via which a person may change over between the vehicle and the further vehicle. The present invention is explained in greater detail below on the basis of figures.

DETAILED DESCRIPTION OF EXAMPLE EMBODIMENTS

Figure 1:
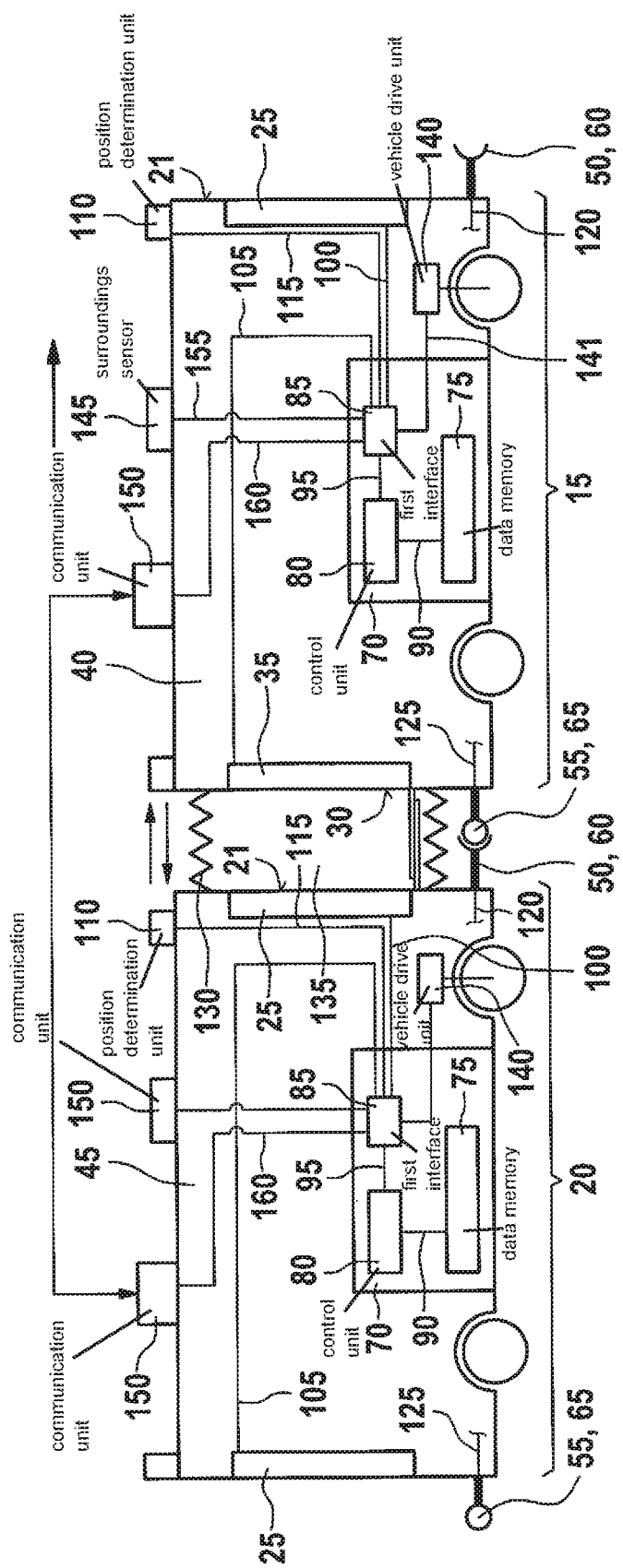
FIG. 1 shows a schematic view of a vehicle combination including a first vehicle and a second vehicle.

FIG. 1 shows a schematic view of a vehicle combination 10.

Vehicle combination 10 includes by way of example a first vehicle 15 and a second vehicle 20. First vehicle 15 and second vehicle 20 are formed identically to one another by way of example in the specific embodiment, so that the explanation hereafter for first vehicle 15 also applies accordingly to second vehicle 20.

First vehicle 15 is designed, for example, as a robo-taxi or as an autonomously driving, in particular driverlessly driving shuttlebus. First vehicle 15 includes a first connecting door 25 on a vehicle front 21 in the travel direction (symbolically indicated with the aid of an arrow in FIG. 1). First vehicle 15 includes a second connecting door 35 at a vehicle rear 30. First connecting door 25 and second connecting door 35 each include a closing unit and a door leaf, the closing unit being designed to move the door leave between a closed position and an open position. Connecting doors 25, 35 may be designed, for example, as sliding doors.

First vehicle 15 furthermore includes a first passenger compartment 40 for transporting passengers in a passenger transportation. Second vehicle 20 includes a second passenger compartment 45 to transport people in second passenger compartment 45. First passenger compartment 40 is delimited with the aid of first connecting door 25 at vehicle front 21 and with the aid of second connecting door 35 at vehicle rear 30. First vehicle 15 may include further vehicle doors (not shown) laterally, through which an entry or exit to first passenger compartment 40 or from first passenger compartment 40 may take place. An entry or exit, for example, at a stop or to the edge of the road, does not take place via a first and/or second connecting door(s) 25, 35, but rather via the laterally situated vehicle doors.

A passage 130 to second vehicle 20 is located behind second connecting door 35 in the travel direction, passage 130 being designed like a tunnel and an interior 135 of passage 130 being protected from weather influences. Second connecting door 35 prevents the access to interior 135 from first passenger compartment 40 in its closed position.

First vehicle 15 may furthermore include a first coupling unit 50 at vehicle front 21 and a second coupling unit 55 at vehicle rear 30. Furthermore, first coupling unit 50 may include a first coupling sensor 60 and second coupling unit 55 may include a second coupling sensor 65. First coupling unit 50 and/or second coupling unit 55 may also be omitted.

First vehicle 15 includes a control device 70. Control device 70 includes a data memory 75, a control unit 80 connected to data memory 75, and a first interface 85. Control unit 80 is connected with the aid of a first connection 90 to data memory 75 and with the aid of a second connection 95 to interface 85. First interface 85 is connected with the aid of a third connection 100 to first connecting door 25 and with the aid of a fourth connection 105 to second connecting door 35. Control device 70 may also include multiple (sub-)control devices, which together form control device 70. Control device 70 may also be designed at least partially as a cloud.

First vehicle 15 furthermore includes a position determination unit 110, position determination unit 110 being connected with the aid of a fifth connection 115 to interface 85. Furthermore, first coupling sensor 60 may be connected with the aid of a sixth connection 120 and second coupling sensor 65 may be connected with the aid of a seventh connection 125 to first interface 85.

In addition, first vehicle 15 may include a surroundings sensor 145 and/or a communication unit 150, surroundings sensor 145 being connected with the aid of an eighth connection 155 to interface 85 and communication unit 150 being connected with the aid of a ninth connection 160 to interface 85.

First vehicle 15 furthermore includes a vehicle drive unit 140 to move and steer first vehicle 15. Vehicle drive unit 25 is connected with the aid of a tenth connection 141 to interface 30. Vehicle drive unit 25 may include one or multiple actuator(s), in particular drive motors and/or actuators for defining the travel direction. Control device 70 is designed in conjunction with vehicle drive unit 140 to steer first vehicle at least 15 semi-automatically. The expression "at least semi-automatically steer" includes the following cases: semi-automatic steering, highly automatic steering, fully automatic steering, driverless steering.

Semi-automatic steering means that in a specific application (for example: driving on an expressway, driving within a predefined driving area, for example, a certain travel route, driving within a lane which is established by lane markings), a longitudinal and a lateral steering are automatically controlled. A vehicle driver of first vehicle 15 does not himself/herself have to manually control the longitudinal and lateral steering of first vehicle 15. The vehicle driver does have to continuously monitor the semi-automatic control of the longitudinal and lateral steering, however, to be able to manually engage immediately if needed.

Highly automatic steering means that in a specific application (for example: driving on an expressway, driving within a predefined driving area, driving within a lane which is established by lane markings), a longitudinal and a lateral steering of first vehicle 15 are automatically controlled. The vehicle driver of first vehicle 15 does not himself have to manually control the longitudinal and lateral steering of first vehicle 15. The vehicle driver does not have to continuously monitor the semi-automatic control of the longitudinal and lateral steering, to be able to manually engage immediately if needed. If needed, a transfer request is automatically output to the vehicle driver to take over the control of the longitudinal and lateral steering. The vehicle driver only takes over the vehicle control after the transfer request. The vehicle driver thus potentially has to be capable of taking over the control of the longitudinal and lateral steering.

Fully automatic steering means that in a specific application (for example: driving on an expressway, driving within a predefined driving area, driving within a lane which is established by lane markings), a longitudinal and/or lateral steering of the motor vehicle is controlled automatically by control unit 40. The vehicle driver of first vehicle 15 does not himself/herself have to manually control the longitudinal and lateral steering of first vehicle 15. The vehicle driver does not have to monitor the automatic control of the longitudinal and lateral steering to be able to engage manually if needed. The vehicle driver is not required in the specific application for this purpose.

Driverless steering—also referred to as autonomous driving—means, in particular for robo-taxis or automatic shuttle buses, that regardless of a specific application (for example: driving on an expressway, driving within a predefined driving area, driving within a lane which is established by lane markings), a longitudinal and lateral steering of first vehicle 15 is automatically controlled, automated by control device 70. The vehicle driver of first vehicle 15 therefore does not have to manually control the longitudinal and lateral steering of first vehicle 15 and/or does not have to monitor the automatic control of the longitudinal and lateral steering. The longitudinal and lateral steering of first vehicle 15 is thus automatically controlled, for example, on all road types, in all speed ranges, and in all environmental conditions. The complete driving task of the vehicle driver is taken over automatically by control device 70, so that the vehicle driver is not required.

First vehicle 15, in the specific embodiment of vehicle combination 10, may thus ideally drive without a vehicle driver from an arbitrary starting position to an arbitrary destination position and may take over the passenger transportation, for example, within the scope of a robo-taxi operation or a shuttle bus. Potential problems are automatically solved by control device 70 during the vehicle control, i.e., without the aid of the vehicle driver.

First vehicle 15 may be a rail-bound vehicle, which travels along a track, for example, as a tram or as a regional train. In an alternative specific embodiment, the first vehicle is a motor vehicle which travels along a road. The at least semi-automatic control of first vehicle 15 may provide with the aid of a control algorithm stored in data memory 75 on the basis of the surroundings ascertained by surroundings sensor 145, with the aid of an information signal via eighth connection 155 via first interface 85 to first control unit 80, and at least automatically, preferably driverless provide on the basis of the first vehicle position of first vehicle 15 ascertained by position determination unit 110, via fifth connection 115 and first interface 85 to first control unit 80. If first vehicle 15 is driverlessly steered, first connecting door 25 may extend essentially over an entire width of vehicle front 21.

Second vehicle 20 travels behind first vehicle 15 in vehicle combination 10, for example. Second vehicle 20 is mechanically connected to second coupling unit 55 of first vehicle 15 with the aid of first coupling unit 50 of second vehicle 20 situated on vehicle front 21 of second vehicle 20, so that a distance between vehicle front 21 of second vehicle 20 and vehicle rear 30 of first vehicle 15 may be kept essentially constant in the coupled state. Coupling unit 50, 55 may also be omitted, in vehicle combination 10, control device 70 of first and/or second vehicle 15, 20 controlling the distance between vehicle front 21 of second vehicle 20 and vehicle rear 30 of first vehicle 15 in such a way that the distance is kept essentially constant. Traction and/or thrust forces may also be exchanged between the two vehicles 15, 20 via coupling units 50, 55.

If first vehicle 15 and second vehicle 20 travel in vehicle combination 10, which is also frequently referred to as a (vehicle) platoon, first connecting door 25 of second vehicle 20 and second connecting door 35 of first vehicle 15 are thus moved into the open position, so that passengers may move between first passenger compartment 40 and second passenger compartment 45 via passage 130. The passengers who have changed over between the two vehicles 15, 20 are protected from weather influences and furthermore protected from falling out by passage 130.

If the two vehicles 15, 20 are decoupled, connecting doors 25, 35 are thus each in the closed position, so that it is only possible to leave passenger compartment 40, 45, for example, via the lateral entry doors (not shown) via the connecting doors at a standstill of vehicle 15, 20. It is not possible to access passage 130 in the decoupled state. Furthermore, in the decoupled state, the two vehicles 15, 20 are spaced apart from one another far enough that passage 130 does not bridge the area between first connecting door 25 and second connecting door 35.

Figure 2:
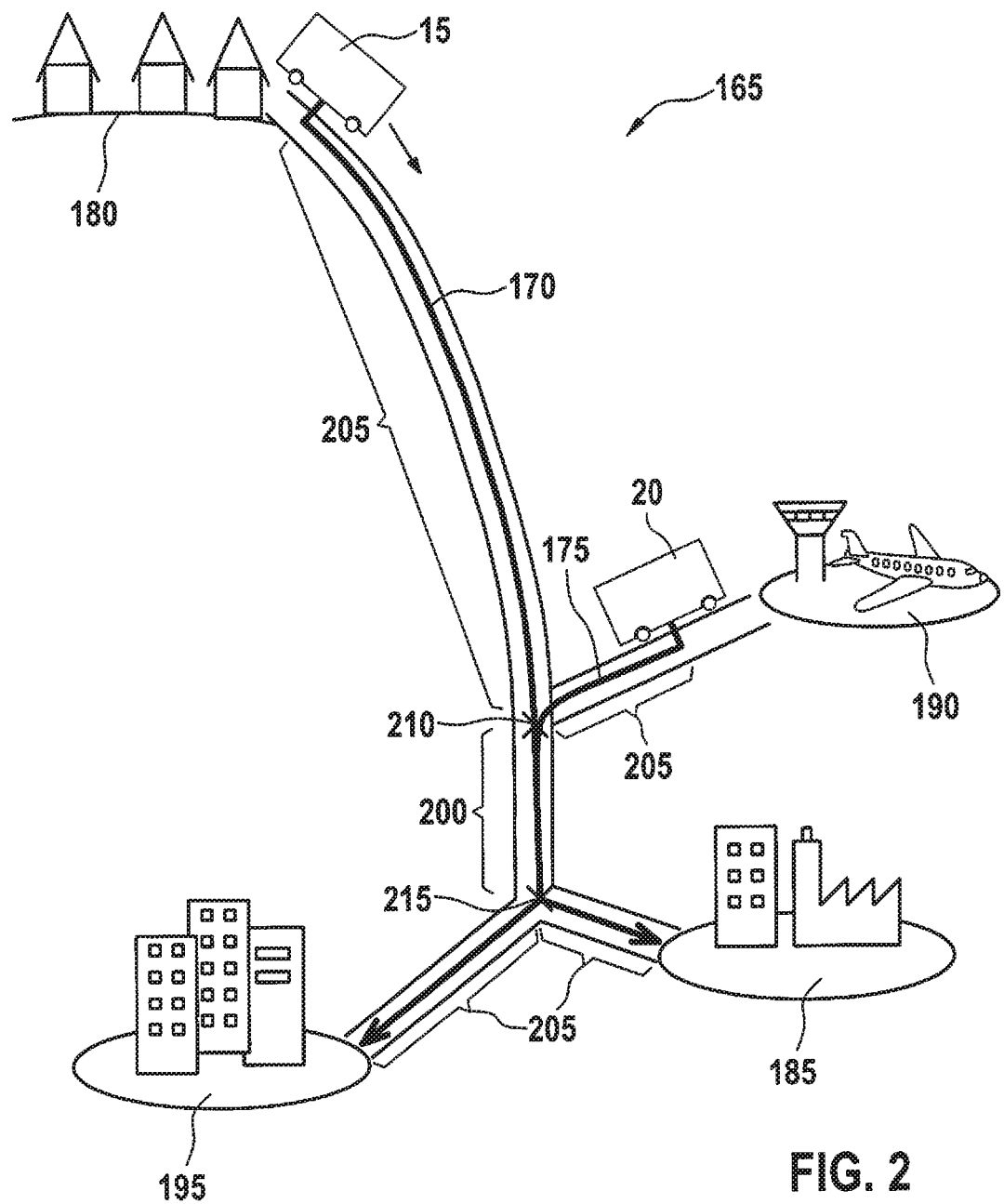
FIG. 2 shows a detail of a schematically shown topographic map.

FIG. 2 shows a detail of a schematically illustrated topographic map 165.

Topographic map 165 may be stored in data memory 75 of control device 70 (of each vehicle 15, 20). Furthermore, for example, a first predefined travel route 170 is at least stored in data memory 75 of first vehicle 15 and, for example, a second predefined travel route 175 is stored in data memory 75 of second vehicle 20 in topographic map 165.

In the specific embodiment, first vehicle 15 and second vehicle 20 are formed by way of example as shuttle buses, which each operate a bus line in a driverless manner, for example. First travel route 170 forms a first bus line and leads from a first location 180, for example, an inter-urban first suburb to a second location 185. Second location 185 may be, for example, an industrial area. Second predefined travel route 175 forms a second bus line and leads from a third location 190, for example, an airport, to a fourth location 195, for example, a downtown.

First travel route 170 and second travel route 175 are traveled by way of example at regular time intervals on the basis of a predefined schedule. In FIG. 2, first vehicle 15 travels along first travel route 170 and second vehicle 20 travels along second travel route 175. Therefore, first vehicle 15 travels from first location 180 to second location 185 and second vehicle 20 travels from third location 190 to fourth location 195. The specifications with respect to travel route 170, 175 are by way of example and are used to explain the method explained in FIG. 3.

First portion 200 of first travel route 170 and second travel route 175 is identical. First portion 200 begins at a first route section 210 and ends at a second route section 215. First route section 210 is formed as a first waypoint and second route section 215 is formed as a second waypoint. The schedule is timed in such a way that in first portion 200, first travel route 170 and second travel route 175 are traveled simultaneously by first and second vehicle 15, 20. In second portion 205, travel routes 170, 175 extend separately. This means that when first vehicle 15 travels along first travel route 170, in second portion 205 of first travel route 170, first vehicle 15 travels alone (i.e., spatially separate in the decoupled state from second vehicle 20) along first travel route 170. Second vehicle 20 also travels along second travel route 175 separately in second portion 205 and travels alone away from first vehicle 15.

Figure 3:
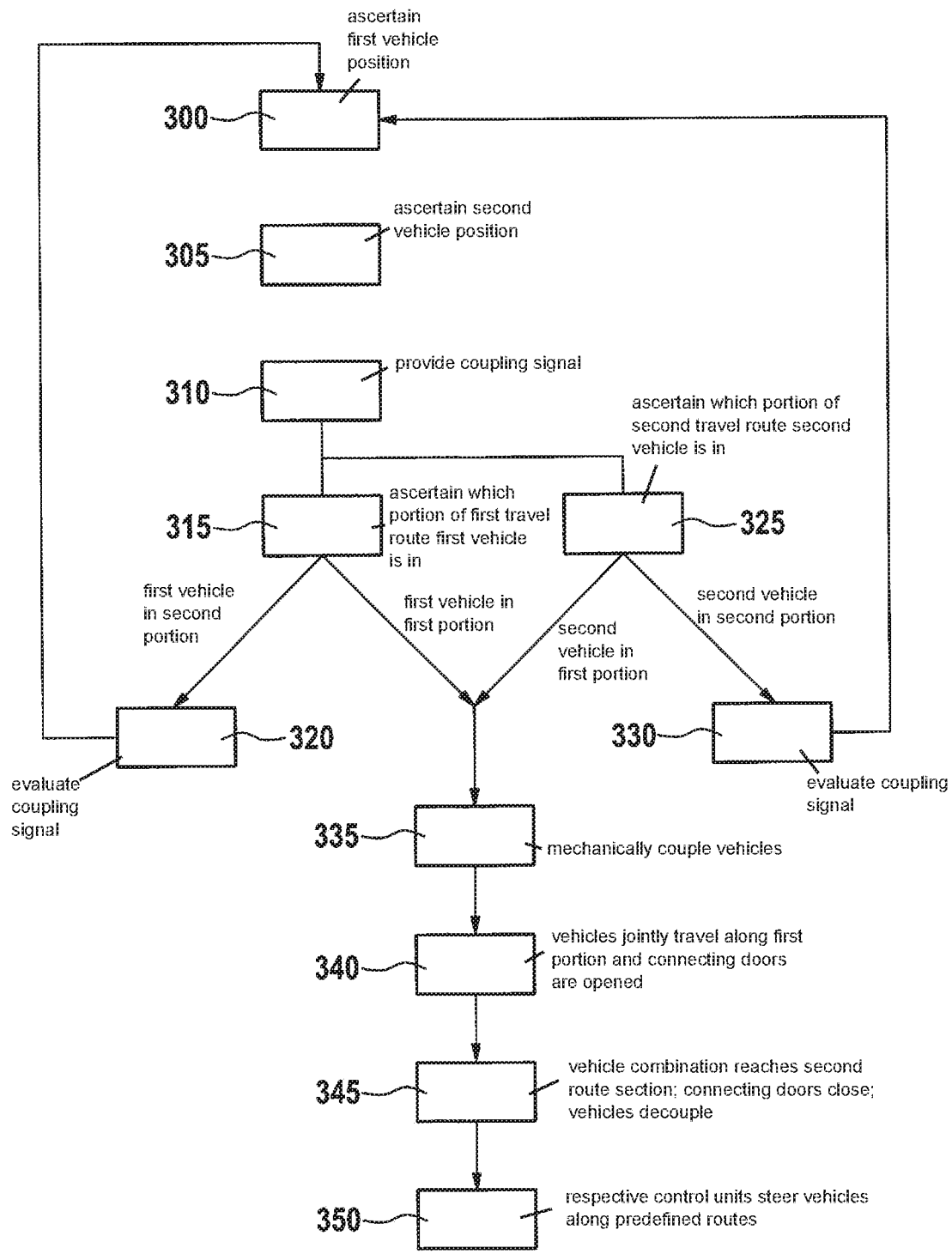
FIG. 3 shows a flow chart of a method according to a first specific embodiment for operating the vehicle combination shown in FIG. 1.

FIG. 3 shows a flow chart of a method according to a first specific embodiment for operating vehicle combination 10.

The method may be stored at least partially in data memory 75 of at least one of the two vehicles 15, 20 as a control algorithm, for example, as a computer-implemented algorithm, in particular a computer program. Data memory 75 may be designed for this purpose, for example, as a machine-readable storage medium.

The computer program includes commands which, upon execution of the computer program by a computer, for example, by control unit 80, prompts it to (at least partially) carry out the method described in FIG. 3 and/or prompt the two control units 80 of the two vehicles 15, 20 to carry it out jointly.

In a first method step 300, position determination unit 110 of first vehicle 15 ascertains the first vehicle position of first vehicle 15. Position determination unit 110 may include, for example, a sensor for receiving signals of a satellite positioning system, for example, from navigation satellites. For example, the sensor is designed to receive signals from, for example, NAVSTAR GPS, Beidou, and/or Galileo. Position determination unit 110 is designed to ascertain the first vehicle position of first vehicle 15 on the basis of the received signals of the satellite positioning system. Position determination unit 110 provides a first position signal having a first piece of information about the first vehicle position of first vehicle 15 via fifth connection 115 of interface 85. Interface 85 provides the first position signal via second connection 95 of control unit 80 of first vehicle 15.

Control unit 80 of first vehicle 15 may additionally carry out a map matching method in first method step 300, the ascertained first vehicle position being verified and associated with first travel route 170 on the basis of the map matching method, the ascertained first vehicle position, and digital topographic map 165 stored in data memory 75.

In addition, in first method step 300, surroundings sensor 145 of first vehicle 15 monitors a surroundings of first vehicle 15 and provides a corresponding first surroundings signal depicting the surroundings including a second piece of information about a surroundings of first vehicle 15 via ninth connection 160 and interface 85 of control unit 80 of first vehicle 15, control unit 80, in first method step 300, controlling vehicle drive unit 141 for the at least semi-automatic travel, in particular the driverless travel along first predefined travel route 170 on the basis of the ascertained first vehicle position, topographic map 165, and the ascertained surroundings of first vehicle 15.

A second method step 305 is designed essentially identically to first method step 300. Position determination unit 110 of second vehicle 20 ascertains a second vehicle position and provides a second position signal including a third piece of information about the second vehicle position of second vehicle 20 via fifth connection 115 of interface 85. Interface 85 provides the second position signal via second connection 95 of control unit 80 of second vehicle 20.

In addition, in second method step 305, surroundings sensor 145 of second vehicle 20 monitors a surroundings of second vehicle 20 and provides a corresponding second surroundings signal depicting the surroundings including a fourth piece of information about a surroundings of second vehicle 20 via ninth connection 160 and interface 85 of control unit 80 of second vehicle 20, control unit 80, in second method step 305, controlling vehicle drive unit 141 for the at least semi-automatic travel, in particular the driverless travel along second predefined travel route 175 on the basis of the ascertained second vehicle position, topographic map 165, and the ascertained surroundings of second vehicle 20.

Second method step 305 may take place at least partially in parallel to first method step 300 with respect to time.

In third method step 310, first coupling sensor 60 and/or second coupling sensor 65 each provide a coupling signal including a fifth piece of information about the coupling state of coupling unit 50, 55. The particular coupling signal is provided via sixth connection 120 of interface 85 of first and second vehicle 15, 20 to interface 85 in each case, interface 85 detecting the coupling signal and providing it via second connection 95 of control unit 80 of first vehicle 15 and/or second vehicle 20.

The coupling signal may contain the (fifth) piece of information that coupling unit 50, 55 is in the coupled state or in the decoupled state. In the coupled state of coupling unit 50, 55, first vehicle 15 is coupled to second vehicle 20 to form vehicle combination 10 shown in FIG. 1. In the decoupled state, first vehicle 15 drives alone, i.e., second vehicle 20 is moved spaced apart and independently from first vehicle 15. Third method step 310 may be omitted if, instead of a mechanical coupling (as shown in FIG. 1), the vehicles are coupled, for example, using a so-called "electronic drawbar" to form vehicle combination 10.

In a fourth method step 315 following third method step 310, control unit 80 of first vehicle 15 ascertains on the basis of the ascertained first vehicle position of first vehicle 15 in which portion 200, 205 of first travel route 170 first vehicle 15 is located. If first vehicle 15 is located in second portion 205, the sequence continues with a fifth method step 320. If first vehicle 15 is located in first portion 200, the sequence thus continues with an eighth method step 330.

In fifth method step 320, control unit 80 of first vehicle 15 may evaluate the coupling signal as to whether the fifth piece of information signals the decoupled state of first vehicle 15. If the coupling signal signals the decoupled state, control unit 80 of first vehicle 15 thus provides, via second connection 95 and at interface 85, a first closing signal for first connecting door 25 and for second connecting door 35. The closing units of connecting doors 25, 35 detect the first closing signal and move/stop connecting doors 25, 35 in the closed position. Furthermore, first through fourth method steps 300 through 315 are repeated following fifth method step 320.

In parallel to fourth method step 315, control unit 80 of second vehicle 20 ascertains in a sixth method step 325 on the basis of the ascertained second vehicle position of second vehicle 20; in which portion 200, 205 of second travel route 175 second vehicle 20 is located. If second vehicle 20 is located in second portion 205, the sequence thus continues with a seventh method step 320. If second vehicle 20 is located in first portion 200, the sequence thus continues with eighth method step 335.

Furthermore, in sixth method step 325, control unit 80 of second vehicle 20 may evaluate the coupling signal of coupling unit 50, 55 as to whether the fifth piece of information signals a coupled state of second vehicle 20 or a decoupled state.

In seventh method step 330, control unit 80 of second vehicle 20 may evaluate the coupling signal of coupling sensor 60, 65 of second vehicle 20 as to whether the fifth piece of information signals the decoupled state of second vehicle 20. If the coupling signal signals the decoupled state, control unit 80 of second vehicle 20 thus provides, via the second connection 95 and at interface 85, a second closing signal for first connecting door 25 and for second connecting door 35 of second vehicle 20 for keeping first and second connecting doors 25, 35 in the closed position. The closing units of connecting doors 25, 35 detect the second closing signal and keep connecting doors 25, 35 of second vehicle 20 in the closed position. Furthermore, first through fourth method steps 300 through 315 are repeated following seventh method step 330.

If vehicles 15, 20 travel according to the schedule, vehicles 15, 20 thus approach, in an eighth method step 335, first route section 210 at the beginning of first portion 200 of the two travel routes 170, 175. The beginning of first portion 200 may be a stop, for example. It would also be conceivable that first route section 210 is an intersection or a route section, at which, for example, second vehicle 20 turns onto the road on which first vehicle 15 is already traveling. At first route section 210, first portion 200 begins, which connects in the travel direction to second portion 205 of first travel route 170 and second travel route 175.

Furthermore, in eighth method step 335, control unit 85 of first vehicle 15 controls vehicle drive unit 140 for the approach of first vehicle 15 to second vehicle 20 on the basis of topographic map 165, the first vehicle position, and predefined first travel route 170 with the aid of a first control signal. Control unit 85 may slightly reduce a travel speed in relation to second vehicle 20, for example.

In eighth method step 335, control unit 85 of the second vehicle also controls vehicle drive unit 140 of second vehicle for the approach of second vehicle 20 to first vehicle 15 on the basis of topographic map 165, the second vehicle position, and predefined second travel route 170 with the aid of a further first control signal. Control unit 85 of the second vehicle, for example, may control a travel speed of the second vehicle slightly higher than a travel speed of the first vehicle, for example.

The coupling procedure may be carried out, for example, in that control device 70 of second vehicle 20 controls vehicle drive unit 140 of second vehicle 20 with the aid of the second control signal in such a way that second vehicle 20 approaches first vehicle 15 sufficiently closely in the travel direction that second coupling unit 55 couples into first coupling unit 50 and first vehicle 15 is thus mechanically coupled to second vehicle 20. The coupling procedure may be carried out, for example, by second vehicle 20 approaching first vehicle 15 sufficiently closely in the travel direction that second coupling unit 55 couples into first coupling unit 50 and first vehicle 15 is thus mechanically coupled to second vehicle 20.

In the eighth method step, the two vehicles 15, 20 may exchange, i.e., transmit and/or receive, data with one another in the form of signals, for example, via communication unit 150, using which, for example, control devices 70 of the two vehicles 15, 20 synchronize the (automated) approach procedure of the two vehicles 15, 20. The approach procedure is used to initiate a coupling procedure following thereon.

If coupling unit 50, 55 is omitted, control device 70 of second vehicle 20 thus controls drive unit 141 of second vehicle 20 with the aid of the second control signal in such a way that second vehicle 20 travels along at a predefined distance in the travel direction behind first vehicle 15. The distance may be monitored, for example, with the aid of surroundings sensor 145 of second vehicle 20 by control unit 80 of second vehicle 20. The uniting of the two vehicles 15, 20 is generally also referred to as platooning or an electronic drawbar. Depending on the design of the coupling procedure, the guiding of vehicle combination 10 may be carried out by leading first vehicle 15. Data may also be exchanged via communication units 150 of the two vehicles 15, 20 to carry out the coupling procedure and to ascertain the second control signal. Thus, for example, during the coupling, control device 70 may control drive unit 141 of the first vehicle with the aid of a further second control signal in such a way that, for example, a travel speed of first vehicle 15 is kept constant.

If second coupling unit 55 of first vehicle 15 engages in first coupling unit 50 of second vehicle 20 during the coupling procedure, the two vehicles 15, 20 are thus mechanically united to form a vehicle combination 10. In the coupled state, i.e., when first coupling unit 50 of second vehicle 20 engages in second coupling unit 55 of first vehicle 15, second coupling sensor 65 of first vehicle 15 provides the coupling signal including the piece of information of the coupled state to interface 85 of first vehicle 15 via seventh connection 125. Interface 85 relays the piece of information via second connection 95 to control unit 80 of first vehicle 15.

First coupling sensor 60 of second vehicle 20 also provides, via sixth connection 120 of second vehicle 20, the coupling signal including the piece of information to interface 85 of control device 70 of second vehicle 20 that first coupling unit 50 of second vehicle 20 is mechanically coupled to second coupling unit 55 of first vehicle 15.

In a ninth method step 335 following eighth method step 330, control unit 80 of first vehicle 15 checks which of the two coupling sensors 60, 65 provides the coupling signal which correlates with the piece of information about the coupled state and which of the two coupling sensors 60, 65 provides a coupling signal which correlates with the decoupled state.

In the exemplary embodiment, first vehicle 15 is positioned in the travel direction ahead of second vehicle 20 by way of example on first route section 210. First coupling sensor 60 of first vehicle 15 thus provides the coupling signal including the piece of information that no further vehicle is coupled to first coupling unit 50. In FIG. 1, second coupling unit 55 (situated on vehicle rear 30) is mechanically coupled to first coupling unit 50 of second vehicle 20.

This applies similarly to second vehicle 20, but merely in the inverse formation. First coupling sensor 60 of second vehicle 20 thus signals that second vehicle 20 is coupled onto first coupling unit 50 situated on the front side. Second coupling sensor 65 situated on the rear provides the coupling signal including the fifth piece of information about the decoupled state.

If vehicles 15, 20 are arranged in succession as shown in FIG. 1, control unit 80 thus provides the third control signal via second connection 95 at interface 85 to open second connecting door 35 at vehicle rear 30 and thus move it from the closed position into the open position. The third control signal is transmitted via fourth connection 105 to second connecting door 35.

Control unit 80 of second vehicle 20 behaves contrarily and provides a fourth control signal at interface 85. The second control signal is transmitted via third connection 100 to first connecting door 25. First connecting door 25 of second vehicle 20 is situated on vehicle front 21 facing toward first vehicle 15. With the aid of the fourth control signal, first connecting door 25 is transferred from the closed position into the open position.

By opening the two connecting doors 25, 35, passage 130 is unblocked in ninth method step 335, so that first passenger compartment 40 is connected to second passenger compartment 45. Passengers who are located in particular passenger compartment 40, 45 may thus change over during the drive along first portion 200. Thus, for example, passengers who come from first location 180 and travel along first predefined travel route 170 with first vehicle 15 may change over in first portion 200 to then travel to fourth location 195 with second vehicle 20. During the drive along first portion 200, persons coming from third location 190, for example, from the airport, could also change over in first portion 200 from second vehicle 20 into first vehicle 15, for example, to travel to third location 190.

Of course, the passengers who wish to travel along first predefined travel route 170 from first location 180 to second location 185 may also remain in first vehicle 15. Passengers who have entered at third location 190 may also remain in second vehicle 20 to reach fourth location 185.

A waiting time at the stop, for example, on first route section 210, may be reduced by the changing over during the drive, since the passengers may change over during the drive. The travel time for vehicles 15, 20 for driving along particular predefined travel route 170, 175 may thus be kept short. In particular, the holding times are thus reduced.

It is to be noted that of course first route section 210 also does not have to be a stop, but rather may be, for example, an intersection or a route section, so that, for example, the two vehicles 15, 20 couple to one another on first route section 210 during the drive. This has the advantage that the travel time for vehicles 15, 20 along particular associated predefined travel route 170, 175 is further reduced.

In tenth method step 340 following ninth method step 335, vehicles 15, 20 jointly travel along first portion 200 of the two travel routes 170, 175 in vehicle combination 10 (as a platoon). Connecting doors 25, 35 opened in ninth method step 335 are open during tenth method step 340.

In an eleventh method step 345, vehicle combination 10 reaches a second route section 215, which corresponds to an end of first portion 200. Second route section 215 may be, for example, a further stop. Predefined travel routes 170, 175 divide at second route section 215, so that second portion 205 of particular travel routes 170, 175 adjoins second route section 215.

Control units 80 ascertain second route section 215 in each case on the basis of the ascertained particular vehicle position in comparison to the travel route 170, 175 stored in each case in data memory 75. At second route section 215, control unit 80 of particular vehicle 15, 20 provides a fifth control signal for connecting doors 25, 35 to close connecting doors 25, 35, so that by closing connecting doors 25, 35, passage 130 is closed.

The passengers transported in passenger compartment 40, 45 may not change over further due to the closing of passage 130.

Furthermore, control unit 80 (of first and/or second vehicle 15, 20) provides a sixth control signal for decoupling vehicles 15, 20 at second route section 215 for particular coupling units 50, 55. The decoupling may be supplemented in parallel by a corresponding control of drive units 141 by particular control unit 85 to move vehicles 15, 20 spatially away from one another. The decoupling of vehicles 15, 20 from vehicle combination 10 may also take place during the drive, so that the travel time of vehicles 15, 20 for driving along travel route 170, 175 is particularly short.

It is to be noted that the decoupling procedure carried out in eleventh method step 345 may also be carried out with respect to time before reaching second route section 215 to ensure reliable separation or departure of individual vehicles 15, 20 in different travel directions at second route section 215.

In a twelfth method step 350 following eleventh method step 345, control units 80 steer particular vehicle 15, 20 along predefined travel route 170, 175 in the at least semi-automatic, preferably driverless driving mode on the basis of travel route 170, 175 stored in data memory 75.

Figure 4:
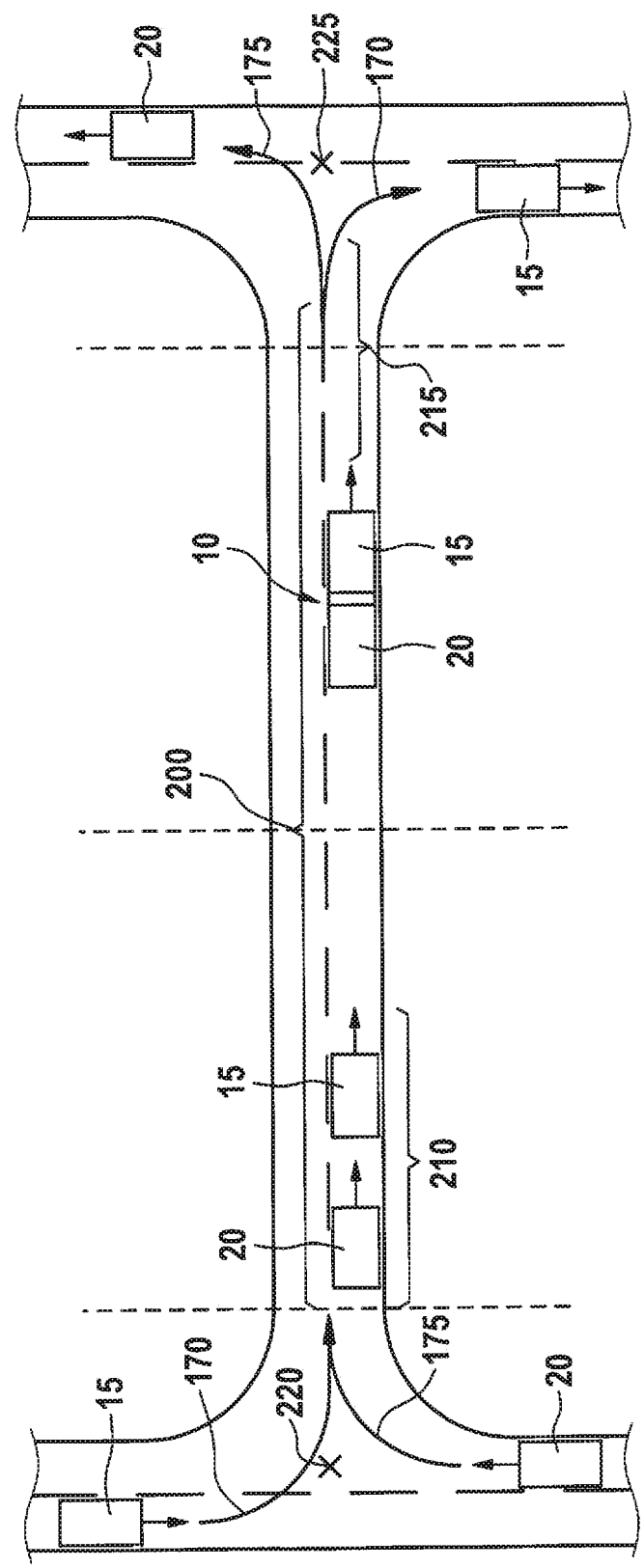
FIG. 4 shows a schematic view of the vehicle combination in multiple situations during a method according to a second specific embodiment for operating the vehicle combination.

FIG. 4 shows a schematic view of vehicle combination 10 in multiple situations during a method according to a second specific embodiment for operating vehicle combination 10.

The method is designed essentially identically to the method described in FIG. 3. The differences from the method described in FIG. 3 are exclusively discussed hereafter.

First route section 210 is formed in FIG. 4 as a first route section of first portion 200, in the first route section, first vehicle 15 and second vehicle 20 being coupled to one another as in the method described in eighth method step 335 in FIG. 3. The coupling takes place during the drive in first route section 210. First route section 210 may follow, for example, a first traffic intersection point 220, at which first travel route 170 and second travel route 175 are guided on shared first portion 200. Second route section 215 may also be formed in the travel direction before a second traffic intersection point 225 as a route section, so that during the drive, vehicle combination 10 made of first vehicle 15 and second vehicle 20 may break up in second route section 210, so that following shared first portion 200, vehicles 15, 20 may travel along particular predefined travel route 170, 175 separately from one another.

Figure 5:
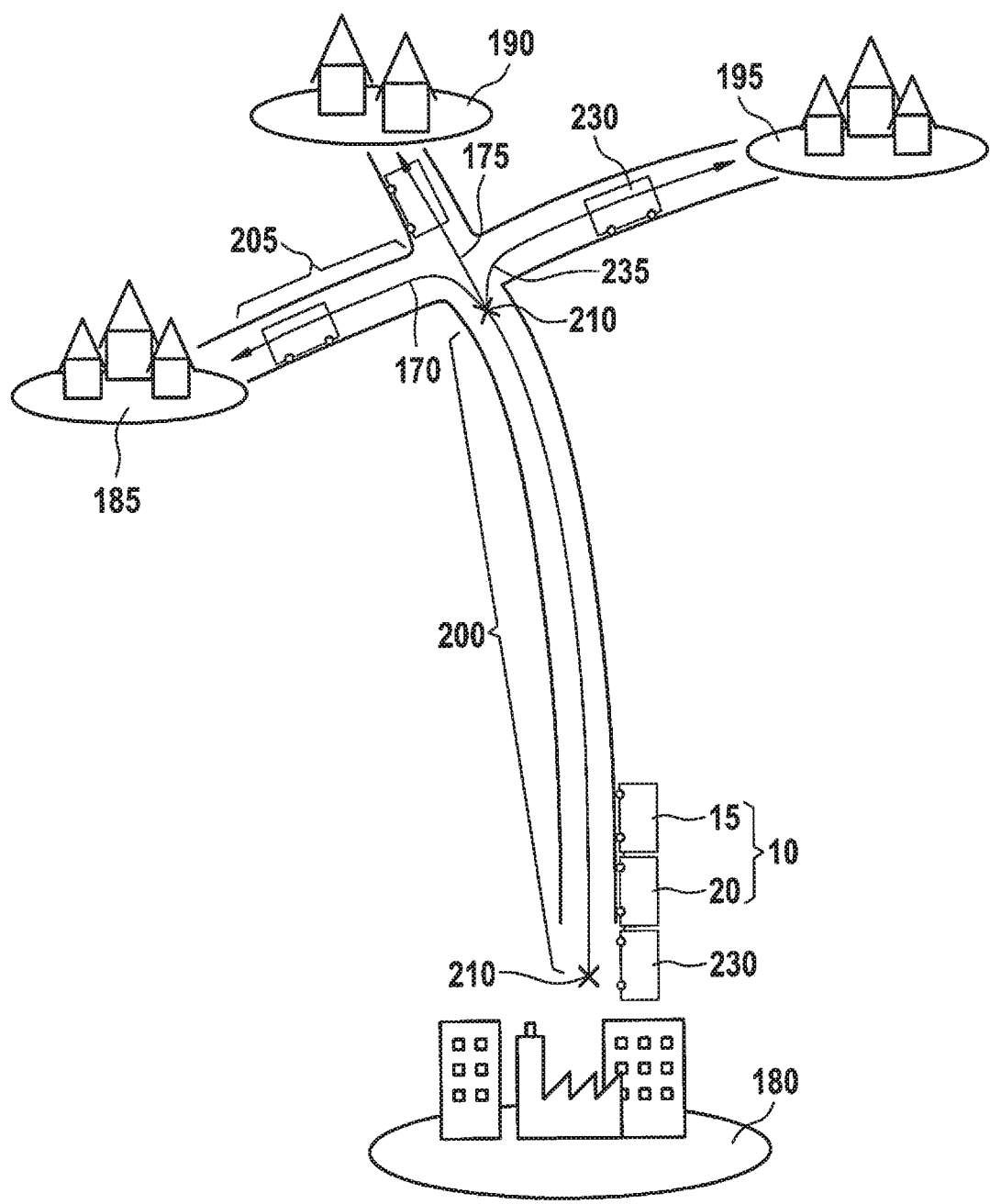
FIG. 5 shows a schematic view of a refinement of the vehicle combination shown in FIGS. 1 through 4.

FIG. 5 shows a schematic view of a refinement of vehicle combination 10 shown in FIGS. 1 through 4.

Vehicle combination 10 includes a third vehicle 230 in addition to first vehicle 15 and second vehicle 20, third vehicle 230 being coupled at the rear in the travel direction to second vehicle 20. Third vehicle 230 is designed identically to first and second vehicles 15, 20. First vehicle 15 drives along first predefined travel route 170 and second vehicle 20 travels along second predefined travel route 175. Third vehicle 230 has a third stored travel route 235 stored in data memory 75, on the basis of which control unit 80 steers third vehicle 230 along third predefined travel route 235. Third vehicle 230 is also preferably steered in a driverless/autonomous manner.

Travel routes 170, 175, 235 all start jointly at first location 180. First location 180 may be a downtown, for example. First portion 200 adjoins following first location 180, so that all travel routes 170, 175, 235 extend identically in first portion 200. Second portion 205 adjoins first portion 200, vehicles 15, 20, 230 traveling along separated in accordance with their predefined travel route 170, 175, 235 in second portion 205, as already explained in FIG. 2. First travel route 170 leads to second location 185, second travel route 175 leads to third location 190, and third travel route 235 leads to fourth location 195, second through fourth locations 185, 190, 195 being located remote from one another. Second through fourth locations 185, 190, 195 are each connected to one another by roads.

In operation of vehicle combination 10 according to the method explained in the method in FIG. 3, first portion 200 is driven through firstly. First portion 200 starts at first location 180 at first route section 210, which in this case may be a stop, for example, at first location 180, the passengers being able to enter vehicles 15, 20, 230 at first route section 210 in the specific embodiment. At first route section 210, control units 80 open connecting doors 25, 35 of particular vehicles 15, 20, 230 with the aid of the third control signal. Both connecting doors 25, 35 of second vehicle 20, which is situated in the middle in vehicle combination 10 between first vehicle 15 and third vehicle 230, are open, so that the passengers who have entered into third vehicle 230 located at the rear in the travel direction may change over during the drive along first portion 200 from third vehicle 230 via second vehicle 20 into first vehicle 15, to then drive to second location 185.

The control of vehicle 15, 20, 230 is carried out with the aid of the method explained in FIG. 3. Each of control units 80 detects reaching second route section 215 by way of the information provided by a position determination unit 110 about the particular vehicle position, upon reaching second route section 215, particular open connecting doors 25, 35 moving from the open position into the closed position on the basis of the fifth control signal. Control unit 80 also activates coupling units 50, 55 at second route section 215 in such a way that coupling units 50, 55 are decoupled with the aid of the sixth control signal.

After the decoupling of vehicles 15, 20, 230, each of vehicles 15, 20, 230 travels along particular predefined travel route 170, 175, 235 stored in data memory 75 to particular second through fourth location 185, 190, 195.

On the return drive, the method is carried out essentially as described in FIG. 3. Vehicles 15, 20, 230 may each arrive at the same time at first route section 210 and may be coupled to one another to drive in the travel direction in the reverse direction in the direction of first location 180.

By way of the designs of control devices 70, vehicles 15, 20, 230 of vehicle combination 10, and the method, which are described in FIGS. 1 through 5, the changeover may take place in each case during the drive, so that the holding time is reduced for the changeover, for example, at first route section 210 or approaching the stop, as explained in FIG. 4, may be avoided. Travel route 170, 185, 235 is thus particularly short with respect to time. Furthermore, a power consumption of vehicle combination 10 is particularly low, since additional stopping for changing over of the passengers is avoided. An idle operation of the drive engines during the waiting time at the stop is also avoided or kept short, in particular in the case of operation of vehicles 15, 20, 230 using internal combustion engines. The power consumption for operating vehicle combination 10 may thus be reduced. An optimization of a traffic flow is furthermore achieved.

It is to be noted that instead of the design of vehicles 15, 20, 230 as shuttle buses explained in FIGS. 1, 2, 4, and 5, vehicles 15, 20, 230 may of course also be designed, for example, as robo-taxis, the different robot taxis being coupled to one another along first portion 200 of different travel routes 170, 175, so that the passengers may change over between the individual robo-taxis.

It is to be noted that vehicle 15, 20, 230 may also be designed, of course, as a rail-bound vehicle, in particular as a rail bus or tram, instead of the design as a motor vehicle.

What is claimed is:

1. A control apparatus for an at least semi-automatically driving vehicle, comprising:
    a control device configured to perform the following:
        providing a first control signal for an approach of a first vehicle, which includes the at least semi-automatically driving vehicle, to a second vehicle in a first portion of a travel route of the first vehicle; and
        providing a second control signal for coupling the first vehicle to the second vehicle in the first portion of the travel route to form a vehicle occupant passage between the first vehicle and the second vehicle via which there is a vehicle occupant change over between the first vehicle and the second vehicle;
        wherein the first vehicle and the second vehicle are mechanically coupled to form the vehicle occupant passage,
        wherein a control unit of the first vehicle performs a map matching, in which an ascertained position of the first vehicle is verified and associated with a travel route based on the ascertained position and a digital topographic map stored in a data memory, and
        wherein the first vehicle includes a first passenger compartment for transporting passengers in a passenger transportation, wherein the second vehicle includes a second passenger compartment to transport people in the second passenger compartment, wherein the first passenger compartment is delimited with a first connecting door at a vehicle front of the second vehicle and with the second connecting door at a vehicle rear of the first vehicle, wherein the occupant passage to the second vehicle is located behind second connecting door in a travel direction, wherein the occupant passage is configured like a tunnel and an interior of the occupant passage is protected from weather, and wherein the second connecting door prevents the access to an interior from the first passenger compartment in a closed position of the second connecting door.

2. The control apparatus as recited in claim 1, wherein the control device is configured to receive and/or transmit a signal for coupling the first vehicle to the second vehicle in the first portion.

3. The control apparatus as recited in claim 1, wherein the control device is configured to receive a further signal about a vehicle position of the first vehicle, and is configured to ascertain the first control signal and the second control signal based on the vehicle position.

4. The control apparatus as recited in claim 1, wherein the control device is configured to, after controlling the coupling of the first vehicle to the second vehicle, to provide a third control signal to control a connecting door of the first vehicle to open the passage.

5. The control apparatus as recited in claim 4, wherein the control device is configured to receive a coupling signal, which signals mechanical coupling of the first vehicle to the second vehicle, and is configured to provide the third control signal only after receiving the coupling signal.

6. A semi-automatically driving vehicle, comprising:
    a control device for a first vehicle, which includes an at least semi-automatically driving vehicle, the control device configured to provide a first control signal for an approach of the first vehicle to a second vehicle in a first portion of a travel route of the first vehicle, and provide a second control signal for coupling the first vehicle to the second vehicle in the first portion of the travel route to form a vehicle occupant passage between the first vehicle and the second vehicle via which there is a vehicle occupant change over between the vehicle and the second vehicle; and
    at least one vehicle drive unit connected to the control device configured to move the first vehicle in a longitudinal and/or lateral direction;
    wherein the control device is configured to transmit the first control signal of the vehicle drive unit for the approach of the first vehicle and the second control signal for the coupling of the first vehicle to the second vehicle;
    wherein the first vehicle and the second vehicle are mechanically coupled to form the vehicle occupant passage, and
    wherein a control unit of the first vehicle performs a map matching, in which an ascertained position of the first vehicle is verified and associated with a travel route based on the ascertained position and a digital topographic map stored in a data memory, and
    wherein the first vehicle includes a first passenger compartment for transporting passengers in a passenger transportation, wherein the second vehicle includes a second passenger compartment to transport people in the second passenger compartment, wherein the first passenger compartment is delimited with a first connecting door at a vehicle front of the second vehicle and with the second connecting door at a vehicle rear of the first vehicle, wherein the occupant passage to the second vehicle is located behind second connecting door in a travel direction, wherein the occupant passage is configured like a tunnel and an interior of the occupant passage is protected from weather, and wherein the second connecting door prevents the access to an interior from the first passenger compartment in a closed position of the second connecting door.

7. The vehicle as recited in claim 6, further comprising:
a connecting door situated at a vehicle front and/or at a vehicle rear of the first vehicle, the connecting door delimiting the passage to the second vehicle;
wherein the control device is configured to transmit a third control signal to the connecting door to move the connecting doors from a closed position into an open position.

8. The vehicle as recited in claim 6, further comprising:
a coupling unit configured to mechanically couple the first vehicle to the second vehicle; and
a coupling sensor, the coupling sensor connected to the control device and configured to provide a coupling signal to the control device corresponding to a coupling state of the coupling unit.

9. A vehicle combination, comprising:
a first vehicle, which includes an at least semi-automatically driving vehicle, and a second vehicle, each of the first vehicle and the second vehicle including:
  a respective control device for an at least semi-automatically driving vehicle, wherein the control device is configured to provide a first control signal for an approach of the respective first vehicle to a respective second vehicle in a first portion of a travel route of the respective first vehicle, and provide a second control signal for coupling the respective vehicle to the respective second vehicle in the first portion of the travel route to form a vehicle occupant passage between the respective first vehicle and the respective second vehicle via which there is a vehicle occupant change over between the first vehicle and the second vehicle, and wherein at least one respective vehicle drive unit is connected to the respective control device, which is configured to move the respective vehicle in a longitudinal and/or lateral direction, wherein the control device is configured to transmit the first control signal of the respective vehicle drive unit for the approach of the respective vehicle and the second control signal for the coupling of the respective first vehicle to the respective second vehicle;
wherein the control device of the first vehicle is configured to steer the vehicle along the first travel route at least semi-automatically,
wherein the control device of the second vehicle is configured to steer the second vehicle along a second travel route at least semi-automatically,
wherein the first predefined travel route and the second predefined travel route extending identically in a first portion,
wherein the first vehicle and the second vehicle are coupled to one another in the first portion,
wherein the first vehicle and the second vehicle are mechanically coupled to form the vehicle occupant passage,
wherein a control unit of the first vehicle performs a map matching, in which an ascertained position of the first vehicle is verified and associated with a travel route based on the ascertained position and a digital topographic map stored in a data memory, and
wherein the first vehicle includes a first passenger compartment for transporting passengers in a passenger transportation, wherein the second vehicle includes a second passenger compartment to transport people in the second passenger compartment, wherein the first passenger compartment is delimited with a first connecting door at a vehicle front of the second vehicle and with the second connecting door at a vehicle rear of the first vehicle, wherein the occupant passage to the second vehicle is located behind second connecting door in a travel direction, wherein the occupant passage is configured like a tunnel and an interior of the occupant passage is protected from weather, and wherein the second connecting door prevents the access to an interior from the first passenger compartment in a closed position of the second connecting door.

10. The vehicle combination as recited in claim 9, wherein the first vehicle delimits a passenger compartment and the second vehicle delimits a further passenger compartment, and wherein the passage connects the passenger compartment to the further passenger compartment for the changeover of the person between the passenger compartment and the further passenger compartment.

11. The vehicle combination as recited in claim 10, wherein a connecting door of the first vehicle and a connecting door of the second vehicle are situated on sides facing toward one another of the respective first vehicle, and wherein in an open position of the connecting doors, the passage between the passenger compartment and the further passenger compartment is open.

12. A method for operating a control device, the control unit including a computer, the method comprising:
providing, by the control device, a first control signal for an approach of a first vehicle, which includes an at least semi-automatically driving vehicle, to a second vehicle in a first portion of a travel route; and
providing, by the control device, a second control signal for the coupling of the first vehicle to the second vehicle in the first portion of the travel route to form a vehicle occupant passage between the first vehicle and the second vehicle via which there is a vehicle occupant change over between the vehicle and the second vehicle;
wherein the first vehicle and the second vehicle are mechanically coupled to form the vehicle occupant passage, and
wherein a control unit of the first vehicle performs a map matching, in which an ascertained position of the first vehicle is verified and associated with a travel route based on the ascertained position and a digital topographic map stored in a data memory, and
wherein the first vehicle includes a first passenger compartment for transporting passengers in a passenger transportation, wherein the second vehicle includes a second passenger compartment to transport people in the second passenger compartment, wherein the first passenger compartment is delimited with a first connecting door at a vehicle front of the second vehicle and with the second connecting door at a vehicle rear of the first vehicle, wherein the occupant passage to the second vehicle is located behind second connecting door in a travel direction, wherein the occupant passage is configured like a tunnel and an interior of the occupant passage is protected from weather, and wherein the second connecting door prevents the access to an interior from the first passenger compartment in a closed position of the second connecting door.

13. A non-transitory machine-readable storage medium, on which is stored a computer program, which is executable by a processor, comprising:
a program code arrangement having program code for operating a control device by performing the following:

providing a first control signal for an approach of a first vehicle, which includes an at least semi-automatically driving vehicle, to a second vehicle in a first portion of a travel route; and providing a second control signal for the coupling of the first vehicle to the second vehicle in the first portion of the travel route to form a vehicle occupant passage between the first vehicle and the second vehicle via which there is a vehicle occupant change over between the first vehicle and the second vehicle;

wherein the first vehicle and the second vehicle are mechanically coupled to form the vehicle occupant passage, wherein a control unit of the first vehicle performs a map matching, in which an ascertained position of the first vehicle is verified and associated with a travel route based on the ascertained position and a digital topographic map stored in a data memory, and wherein the first vehicle includes a first passenger compartment for transporting passengers in a passenger transportation, wherein the second vehicle includes a second passenger compartment to transport people in the second passenger compartment, wherein the first passenger compartment is delimited with a first connecting door at a vehicle front of the second vehicle and with the second connecting door at a vehicle rear of the first vehicle, wherein the occupant passage to the second vehicle is located behind second connecting door in a travel direction, wherein the occupant passage is configured like a tunnel and an interior of the occupant passage is protected from weather, and wherein the second connecting door prevents the access to an interior from the first passenger compartment in a closed position of the second connecting door.

* * * * *